Figure 1:
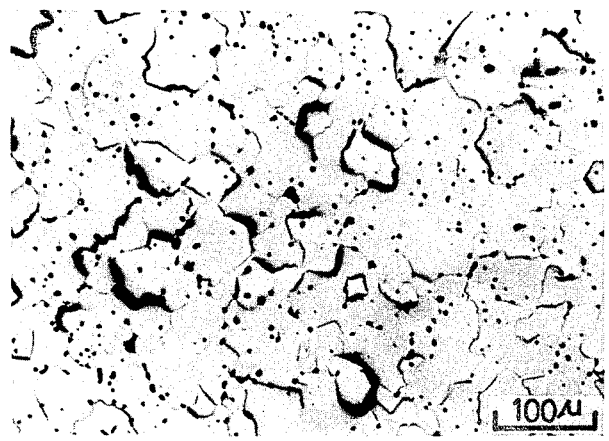
Figure 2:
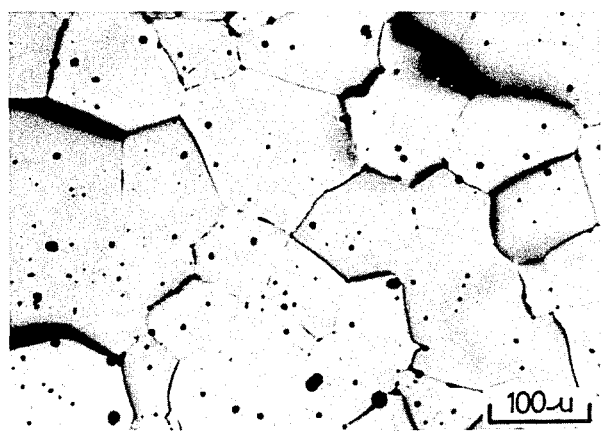
Figure 3:
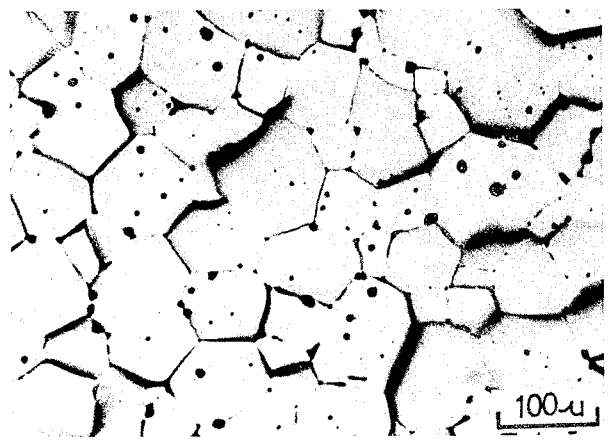
Figure 4:
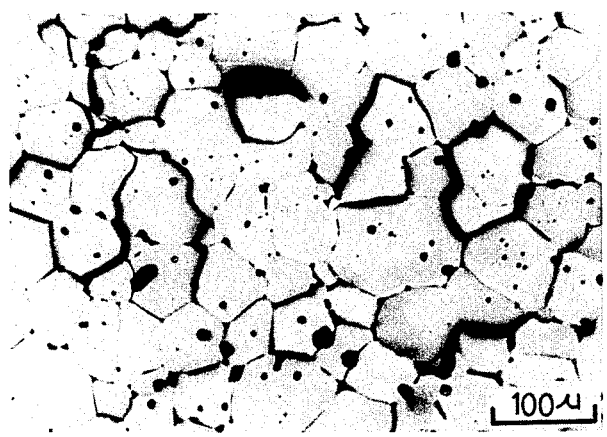

United States Patent [19]

Yamamoto et al.

[11] Patent Number: 4,585,743
[45] Date of Patent: Apr. 29, 1986

[54] HIGH DENSITY MAGNESIA CLINKER AND PROCESS FOR ITS PRODUCTION

[75] Inventors: Kosei Yamamoto; Akira Kaneyasu, both of Ube, Japan

[73] Assignee: Ube Chemical Industries Co., Inc., Yamaguchi, Japan

[21] Appl. No.: 598,698

[22] Filed: Apr. 10, 1984

[30] Foreign Application Priority Data

Apr. 12, 1983 [JP] Japan .................................. 58-62963

[51] Int. Cl.$^4$ ............................................. C04B 35/04
[52] U.S. Cl. .................................... 501/108; 501/122; 423/636; 423/637
[58] Field of Search ................ 501/108, 122; 423/636, 423/637

[56] References Cited

U.S. PATENT DOCUMENTS

| 3,954,488 | 5/1976 | Coatney | 501/122 |
| 3,965,240 | 6/1976 | Hughey | 423/155 |
| 4,126,478 | 11/1978 | Bowman | 501/122 |
| 4,330,525 | 5/1982 | Reynolds et al. | 501/108 |
| 4,423,026 | 12/1983 | Snellgrove | 501/108 |

FOREIGN PATENT DOCUMENTS

| 247939 | 10/1962 | Australia | 423/636 |
| 56-32322 | 4/1981 | Japan | 423/636 |
| 57-34022 | 2/1982 | Japan | 423/636 |

Primary Examiner—William R. Dixon, Jr.
Assistant Examiner—Steven Capella
Attorney, Agent, or Firm—Sherman and Shalloway

[57] ABSTRACT

High density magnesia clinker characterized by having a chemical composition, as oxides in weight %, of
MgO: 97.5% or more
CaO: 0.8–2.0%
$SiO_2$: 0.12–1.0%
$Fe_2O_3$: 0.3% or less
$Al_2O_3$: 0.15% or less
$B_2O_3$: 0.03% or less
with a bulk density of at least 3.48 g/cm$^3$. The said high density magnesia clinker can be produced by forming magnesium oxide by calcination of naturally occurring magnesite having a composition, based on ignition in weight %,
MgO: 97.5% or more
CaO: 0.8–2.0%
$SiO_2$: traces to 0.15%
$Fe_2O_3$: 0.3% or less
$Al_2O_3$: 0.15% or less
$B_2O_3$: 0.1% or less,
grinding the same after, or with, addition of amorphous silica, silica gel or a silicon compound capable of forming $SiO_2$ by dead-burning in such a manner as to have the $SiO_2$ content of 0.12–1.0% after dead-burning and dead-burning.

22 Claims, 8 Drawing Figures

HIGH DENSITY MAGNESIA CLINKER AND PROCESS FOR ITS PRODUCTION

The present invention relates to high purity magnesia clinker and to a process for its production. More particularly, it relates to high purity and high density magnesia clinker containing, as oxides, MgO in amounts of at least 97.5 weight % and having a bulk density of at least 3.48 g/cm$^3$, and to a process for its production.

Heretofore, as attempts to produce high density magnesia clinker from naturally occurring magnesite there is known a process of pulverizing to fine particles with particle diameter of about 10 microns or less naturally occurring magnesite having the following composition:
  SiO$_2$: 0.91–1.10%
  Al$_2$O$_3$: 0.08–0.11%
  Fe$_2$O$_3$: 0.62–1.71%
  CaO: 0.38–1.88%
  B$_2$O$_3$: 0.0008–0.014%
  MgO: 95.3–97.9%
  Ignition loss: 51.4–51.7%,
calcining these fine particles at about 1500° to 1800° F. (about 815° to 982° C.), further pulverizing the calcined products to fine particles having Fischer average particle diameter less than about 2 microns, molding and dead-burning (refer to the U.S. Pat. No. 3,712,599). According to this process, as mentioned in the said U.S. patent specification, the maximum bulk density obtained is no more than 3.38 g/cm$^3$.

Incidentally, with progress of steel-making techniques in recent years conditions at which to operate converters have become severe and with this magnesia-carbon bricks are gradually taking the place of synthetic magnesia-dolomite bricks heretofore widely used as a lining for converter. As factors affecting the properties of magnesia-carbon bricks as unburned bricks there can be cited, for instance, physico-chemical properties of magnesia clinker and graphite per se, proportions in which they are mixed or kind of binder, etc., but they are not sufficiently investigated as yet. The matrix part of high purity magnesia bricks are first preferentially eluted with slags and then magnesia particles are eroded as if peeled off in liberated condition, but it is said that in magnesia-carbon bricks erosion begins with magnesia particles in themselves due to presence of carbon being no good in wetting with the slags. It is desirable, therefore, that magnesia per se suitable for use in magnesia-carbon bricks should be of high purity and preferably, further have larger periclase crystal particles.

Therefore, the objective of the present invention is to provide magnesia clinker having as high a bulk density as at least 3.48 g/cm$^3$.

Another objective of the present invention is to provide a process for the production of magnesia clinker having a bulk density of at least 3.48 g/cm$^3$ from naturally occurring magnesite.

Still another objective of the present invention is to provide magnesia clinker having a high density and large crystal particles and a process for its production.

Other further objectives and advantages of the present invention will become clear from following descriptions.

Such objectives and advantages of the present invention can be achieved by high density magnesia clinker characterized by having a chemical composition, as oxides in weight %,
  MgO: 97.5% or more
  CaO: 0.8–2.0%
  SiO$_2$: 0.12–1.0%
  Fe$_2$O$_3$: 0.3% or less
  Al$_2$O$_3$: 0.15% or less
  B$_2$O$_3$: 0.03% or less
with a bulk density of at least 3.48 g/cm$^3$.

FIGS. 1–4, FIG. 7 and FIG. 8 are each microscopic photographs of high density magnesia clinkers of the present invention.

Figure 5:
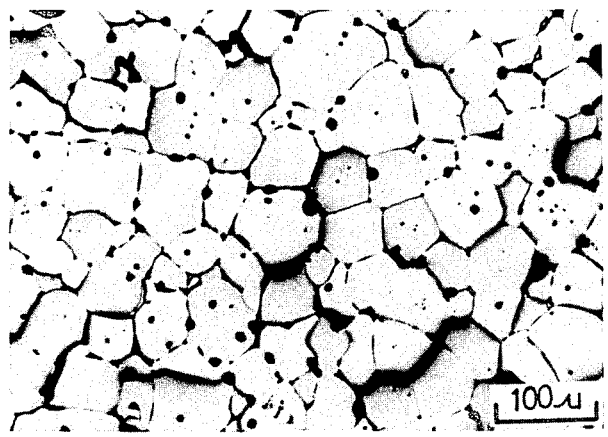
Figure 6:
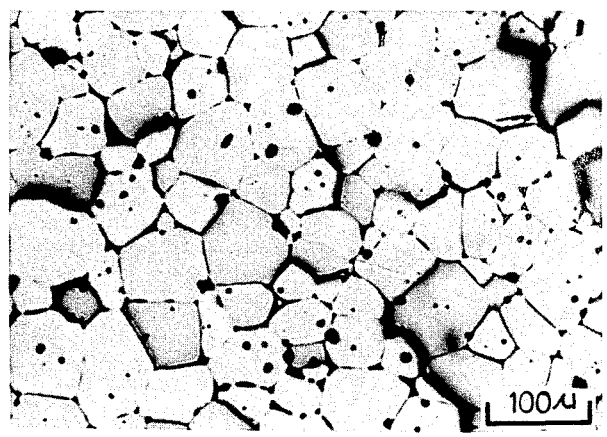

Further, FIG. 5 and FIG. 6 are microscopic photographs of magnesia clinkers for comparison. In this connection, the minimum scale in photographs of FIG. 7 and FIG. 8 indicates a length of 10$\mu$.

The said high density magnesia clinker of the present invention, according to the present invention, can be produced by forming magnesium oxide by calcination of naturally occurring magnesite having a composition, based on ignition in weight %,
  MgO: 97.5% or more
  CaO: 0.8–2.0%
  SiO$_2$: traces to 0.15%
  Fe$_2$O$_3$: 0.3% or less
  Al$_2$O$_3$: 0.15% or less
  B$_2$O$_3$: 0.1% or less,
grinding the same after, or with, addition of amorphous silica, silica gel or a silicon compound capable of forming SiO$_2$ by calcination in such a manner as to have the SiO$_2$ content of 0.12–1.0% after calcination and dead-burning.

Naturally occurring magnesite used in the process of the present invention may be either cryptocrystalline or saccharoidal crystalline, but cryptocrystalline ones are preferred. Naturally occurring magnesite used in the present invention has the said composition and is very characteristic in the point that is very high in MgO content based on ignition, whereas it is very low in SiO$_2$ and Fe$_2$O$_3$ contents, and differs in this point from heretofore-known naturally occurring magnesite.

Such naturally occurring magnesite is available, for instance, as natural magnesite having the following composition, in weight % based on oxides:
  MgO: 47.27–47.55%
  CaO: 0.62–0.68%
  SiO$_2$: traces of 0.01%
  Fe$_2$O$_3$: traces
  Al$_2$O$_3$: 0.02–0.03%
  B$_2$O$_3$: traces to 0.01%
  Ignition loss: 51.8–52.0%
  CO$_2$: 46.4–50.0%,
or natural magnesite having the following composition:
  MgO: 46.74–47.24%
  CaO: 0.41–0.81%
  SiO$_2$: traces to 0.06%
  Fe$_2$O$_3$: traces to 0.15%
  Al$_2$O$_3$: 0.03–0.07%
  B$_2$O$_3$: 0.02–0.05%
  Ignition loss: 51.8–52.0%
  CO$_2$: 46.7–46.9%.

The process of the present invention is carried out by, first, forming magnesium oxide by calcination of naturally occurring magnesite as the above, adding thereto amorphous silica, silica gel or a silicon compound capable of forming SiO$_2$ by calcination, grinding after, or with, its addition and then dead-burning. SiO$_2$ supply sources, such as amorphous silica and so on, are added in such a manner that the SiO$_2$ content after calcination reaches 0.12 to 1.0 weight %.

It is very important to carry out the said respective steps in the process of the present invention in the said order and carry out by adjusting the $SiO_2$ content as the above. For instance, if the said natural magnesite of the composition in the beginning is calcined as such, all that is obtained is magnesia clinker with a bulk density of the order of 3.22 g/cm$^3$, whereas if the naturally occurring magnesite is ground without being calcined, then molded and dead-burned, all that is obtained is magnesia clinker with a bulk density of the order of 3.40 g/cm$^3$. Further, if $SiO_2$ is added to the naturally occurring magnesite in such a manner as to have the $SiO_2$ content of 0.12–1.0 weight % after calcination to grind, mold and dead-burn, magnesia clinker with a bulk density of the order of about 3.45 g/cm$^3$ is obtained, but it was impossible to obtain magnesia clinker having a bulk density above that.

In the process of the present invention the calcination of naturally occurring magnesite can be carried out at a temperature of about 700° to 1400° C. The instant inventors' study showed the effect of the calcination temperature on both the bulk density of the finally obtained magnesia clinker and the size of periclase crystal particles. That is, it was made clear that the bulk density of magnesia clinker should show the maximum value at the calcination temperature of about 1000° C. In the process of the present invention, particularly as the calcination temperature for the production of high density magnesia clinker, a temperature of preferably 800°–1200° C., more preferably 850°–1150° C. and further preferably 900°–1100° C., is recommended.

Magnesite ($MgCO_3$) is said to initiate thermal decomposition to magnesium oxide (MgO) and carbon dioxide ($CO_2$) at about 600° C. and naturally occurring magnesite forms magnesium oxide upon being subjected to the calcination step of the present invention. According to the process of the present invention, the $SiO_2$ content of magnesium oxide formed is adjusted prior to calcination. As mentioned above, even if the $SiO_2$ content is adjusted by adding $SiO_2$ supply sources directly to naturally occurring magnesite, the intended high density magnesia clinker of the present invention having a bulk density of at least 3.48 g/cm$^3$ cannot be obtained. This implies that the production of high density magnesia clinker with a bulk density of at least 3.48 g/cm$^3$ was made possible for the first time by the process of the present invention involving the using of naturally occurring magnesite with a much less $SiO_2$ content, and it teaches that high density magnesia clinker with a bulk density of at least 3.48 g/cm$^3$ cannot be obtained from naturally occurring magnesite having as high an $SiO_2$ content as 0.91–1.10 weight % of $SiO_2$, such as mentioned in the said U.S. Pat. No. 3,712,599, for instance.

In the process of the present invention, for the amount of $SiO_2$ supply sources added to magnesium oxide formed by calcination, it is added in such a manner that the $SiO_2$ content of the calcined magnesia clinker reaches 0.12–1.0 weight %. The instant inventors' study showed the great effect of the $SiO_2$ content of magnesia clinker obtained on the bulk density of the magnesia clinker as well as the size of periclase crystal particles. That is, the maximum values of bulk density of magnesia clinker and periclase crystal particles were shown to be present in the range of the $SiO_2$ content of 0.12 to 1.0 weight %. According to the process of the present invention magnesia clinker having a higher bulk density is obtained by adding $SiO_2$ supply sources in such a manner that the $SiO_2$ content of magnesia clinker reaches 0.13 to 0.8 weight %, and further, high density and coarse crystal particle magnesia clinker is obtained by adding $SiO_2$ supply sources in such a manner that the $SiO_2$ content of magnesia clinker reaches 0.14 to 0.4 weight %.

$SiO_2$ supply sources need to be present on the occasion that magnesium oxide formed by calcination is being subjected to grinding treatment, and consequently, grinding can be effected after, or with, addition of $SiO_2$ supply sources. Grinding can be effected in a vibration ball mill or disk type vibration mill or the like, preferably it is effected in the vibration ball mill. Grinding conditions can be widely employed, but in the case of using the vibration ball mill, for instance, balls 1.5–3 cm in diameter, for instance, are packed in the mill in such a manner that filling percent per inner capacity reaches 70–90%, and the amplitude can be set at 5–11 mm and treatment amount at about 0.8–3 kg per liter of inner capacity of the mill and per hour.

The grinding step in the process of the present invention lies in finely dividing magnesium oxide formed by calcination, while at the same time as mixing with fine particles of the $SiO_2$ supply source sufficiently uniformly and preparing a finely divided mixture giving high density magnesia clinker by calcination. According to the instant inventors' study, magnesite is converted to magnesium oxide by calcination chemical composition-wise, but even if converted to magnesium oxide, it still retains a residual form (skeleton) of magnesite crystal and in the case of calcining such magnesium oxide without grinding with the skeleton of magnesite crystal remaining as such, high bulk density magnesia clinker is shown to be very hard to produce, to say the least of it.

According to the present invention grinding should preferably be effected in such a manner as to break the crystal skeleton of magnesite. The crystal skeleton of magnesite can be broken by pulverizing calcined magnesium oxide particles comprising an integrated assembly of periclase crystal particles of magnesium oxide as far as to periclase crystal particles or their assembly smaller than the said assembly.

According to the process of the present invention, the finely divided mixture obtained by grinding is then optionally molded, and after that, dead-burned to give high density magnesia clinker.

Dead-burning can be effected usually at a temperature of about 1900° to about 2100° C. Further, molding can be carried out at a pressure of about 1 to 3 ton/cm$^2$.

Thus, the present invention, as mentioned earlier, provides high density magnesia clinker of the present invention having a chemical composition, as oxides in weight %, of MgO: 97.5% or more
CaO: 0.8–2.0%
$SiO_2$: 0.12–1.0%
$Fe_2O_3$: 0.3% or less
$Al_2O_3$: 0.15% or less
$B_2O_3$: 0.03% or less with a bulk density of at least 3.48 g/cm$^3$.

High density magnesia clinker of the present invention contain preferably 0.13 to 0.8 weight % of $SiO_2$. Particularly magnesia clinker of the present invention with the $SiO_2$ content of 0.14–0.4 weight % has not only high density but also large crystal particles.

High density magnesia clinker of the present invention are also respectively 0.3 weight % or less (preferably 0.1 weight % or less) and 0.15 weight % or less in $Fe_2O_3$ and $Al_2O_3$ contents.

The present invention can provide high density and high purity magnesia clinker containing at least 98.0 weight % of MgO and 0.8–1.6 weight % of CaO.

High density magnesia clinker of the present invention, as mentioned above, has as great a bulk density as at least 3.48 g/cm$^3$, preferably at least 3.50 g/cm$^3$.

Magnesia clinker provided by the present invention is preferably at least 70$\mu$, more preferably at least 80$\mu$, in average particle diameter of periclase crystal particles, and the present invention also provides magnesia clinker having larger periclase crystal particles with the said average particle diameter above 100$\mu$.

Hereinafter the present invention will be explained in more detail by way of working examples, but the present invention will no way be limited by working examples.

Further, various physical properties in the instant specification were determined by following procedures.

Chemical composition

Measured in conformity with the "Method 1 of the Japan Society for the Promotion of Scientific Research Chemical Analytical Method of Magnesia Clinker" (refer to Refractory Notebook (1981)) determined in the Japan Society for the Promotion of Scientific Research, Committee 124, Test Method Subcommittee.

Particularly for analysis of $B_2O_3$ it was conducted by the curcumin method (absorbance method) employed as the method of the Japan Society for the Promotion of Scientific Research upon investigation by the said Committee.

Bulk density (bulk specific gravity)

Determined by the following calculation formula in conformity with the "Method 2 of the Japan Society for the Promotion of Scientific Research Methods for measurements of apparent porosity, apparent specific gravity and bulk specific gravity of magnesia clinker" (refer to Refractory Notebook (1981)) determined in the Japan Society of the Promotion of Scientific Research, committee 124, Test method Subcommittee.

$$\text{Bulk density} = \frac{W_1}{W_3 - W_2} \times S$$

$W_1$: Dry weight (g) of clinker
$W_2$: Weight (g) in kerosene of sample saturated with kerosene
$W_3$: Weight (g) of sample saturated with kerosene
$S$: Specific gravity (g/cm$^3$) of kerosene at the measurement temperature Average particle diameter of periclase crystals Considering the particle size distribution of clinker, those with particle size of the order of 5–10 mm are taken out at random. These are ground and polished surfaces are observed by reflection microscope. Photographs of three portions regarded as representative are taken at a magnification of 50 times and these ones are enlarged 3 times and printed on photographic paper. All of particle diameters of periclase particles in three photographs are measured and their average value is set as average particle diameter of periclase crystals.

Further, in order to show the crystal particle diameter distribution proportions in which at least 75$\mu$ particles occupy and proportions in which at least 100$\mu$ particles occupy are determined as proportions in which crystals occupy.

EXAMPLES 1–4 AND COMPARATIVE EXAMPLES 1 AND 2

Naturally occurring magnesite having a cryptocrystalline crystal form and further, a chemical composition of MgO 47.55%, CaO 0.62%, $SiO_2$ 0.03%, $Fe_2O_3$ traces, $Al_2O_3$ 0.03%, $B_2O_3$ 0.01% and ignition loss 51.79% was calcined at 1000° C. for 1 hour in an electric furnace. 400 g of this calcined MgO powder was ground for 30 minutes in a vibration ball mill with an inner capacity of 6.8 l packed 80% with balls 2.5 cm (1 inch) in diameter. At that time $SiO_2$ material was simultaneously added in such a manner as to give a chemical composition after dead-burning as shown in the following Table 1. The $SiO_2$ material-added calcined MgO powder after grinding was pressure molded at a pressure of 2 t/cm$^2$ and then dead-burned at 2000° C. in an oxygen-propane furnace. Table 1 shows chemical composition and bulk density of calcined magnesia clinker as well as average particle diameter and distribution of periclase crystals.

Further, FIGS. 1–4 show microscopic photographs of magnesia clinkers obtained in Examples 1–4, respectively. FIGS. 5 to 6 are microscopic photographs of magnesia clinkers obtained in Comparative Examples 1 and 2, respectively.

TABLE 1

|  | Chemical composition (%) | | | | | | Bulk density (g/cm$^3$) | Average particle diameter of periclase crystals ($\mu$) | Proportions in which crystals occupy (%) | |
| --- | --- | --- | --- | --- | --- | --- | --- | --- | --- | --- |
|  | MgO | CaO | $SiO_2$ | $Fe_2O_3$ | $Al_2O_3$ | $B_2O_3$ |  |  | >75$\mu$ | >100$\mu$ |
| Example 1 | 98.61 | 1.19 | 0.12 | 0.03 | 0.06 | <0.01 | 3.48 | 65 | 23.9 | 10.9 |
| Example 2 | 98.57 | 1.13 | 0.20 | 0.04 | 0.05 | <0.01 | 3.50 | 107 | 86.2 | 48.3 |
| Example 3 | 98.30 | 1.13 | 0.38 | 0.04 | 0.05 | <0.01 | 3.51 | 78 | 52.2 | 28.3 |
| Example 4 | 97.84 | 1.16 | 0.86 | 0.04 | 0.05 | <0.01 | 3.50 | 73 | 36.8 | 12.3 |
| Comparative Example 1 | 97.71 | 1.15 | 1.05 | 0.04 | 0.05 | <0.01 | 3.47 | 62 | 19.1 | 5.9 |
| Comparative Example 2 | 97.56 | 1.16 | 1.20 | 0.04 | 0.05 | <0.01 | 3.47 | 63 | 26.3 | 6.6 |

EXAMPLE 5

Figure 7:
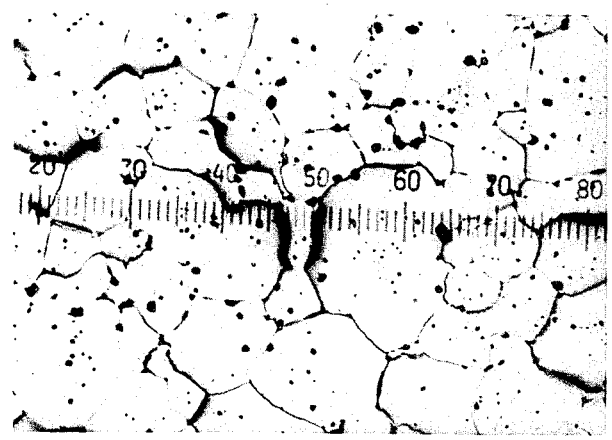

Naturally occurring magnesite having a saccharoidal crystalline crystal form and further, a chemical composition of MgO 47.09%, CaO 0.41%, $SiO_2$ traces, $Fe_2O_3$ 0.12%, $Al_2O_3$ 0.03%, $B_2O_3$ 0.03% and ignition loss 51.87% was treated by the same treatment method (with the proviso that the amount of $SiO_2$ added should be an amount enough to give the composition of Table 2), molding method and dead-burning method as used in Examples 1–4. Table 2 shows chemical composition and bulk density of magnesia clinker obtained as well as average particle diameter and distribution of periclase crystals. Further, FIG. 7 shows a microscopic photograph of magnesia clinker obtained.

TABLE 2

| Chemical composition (%) | | | | | | Bulk density $(g/cm^3)$ | Average particle diameter of periclase crystals ($\mu$) | Proportions in which crystals occupy (%) | |
|---|---|---|---|---|---|---|---|---|---|
| MgO | CaO | $SiO_2$ | $Fe_2O_3$ | $Al_2O_3$ | $B_2O_3$ | | | >75$\mu$ | >100$\mu$ |
| 98.57 | 0.85 | 0.24 | 0.26 | 0.07 | 0.008 | 3.47 | 93 | 64.8 | 40.7 |

EXAMPLE 6

Naturally occurring magnesite used in Example 5 was calcined at 1000° C. for one hour in an electric furnace and then ground in like manner as in the grinding treatment by means of the vibration ball mill in Examples 1–4. Further, prior to grinding $SiO_2$ material and calcium hydroxide were added in amounts enough to give amounts shown in Table 3. The ground calcined powder was pressure molded at a pressure of 2 t/cm² and further dead-burned at 2000° C. in an oxygen-propane gas furnace.

Table 3 shows chemical composition and bulk density of the calcined product as well as average particle diameter and distribution of periclase crystals.

Figure 8:
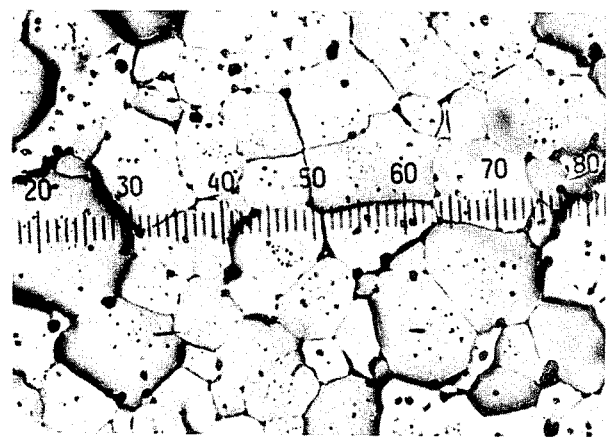

Further, FIG. 8 shows a microscopic photograph of magnesia clinker obtained.

TABLE 3

| Chemical composition (%) | | | | | | Bulk density $(g/cm^3)$ | Average particle diameter of periclase crystals ($\mu$) | Proportions in which crystals occupy (%) | |
|---|---|---|---|---|---|---|---|---|---|
| MgO | CaO | $SiO_2$ | $Fe_2O_3$ | $Al_2O_3$ | $B_2O_3$ | | | >75$\mu$ | >100$\mu$ |
| 97.80 | 1.41 | 0.37 | 0.23 | 0.08 | 0.005 | 3.50 | 80 | 52.4 | 27.5 |

What we claim is:

1. High density magnesia clinker characterized by having a chemical composition, as oxides in weight%, of
   MgO: 97.5% or more
   CaO: 0.8–2.0%
   $SiO_2$: 0.12–1.0%
   $Fe_2O_3$: 0.3% or less
   $Al_2O_3$: 0.15% or less
   $B_2O_3$: 0.03% or less
with a bulk density of at least 3.48 g/cm³, and in which the average diameter of periclase crystals of magnesia is 70$\mu$ or more.

2. High density magnesia clinker according to claim 1 in which the magnesia clinker is derived from naturally occurring magnesite.

3. High density magnesia clinker according to claim 1 in which the $SiO_2$ content, as oxides in weight %, is 0.13–0.8%.

4. High density and large crystal particle magnesia clinker according to claim 1 or 2 in which the $SiO_2$ content, as oxides in weight %, is 0.14–0.4%.

5. High density magnesia clinker according to claim 1 in which the $Fe_2O_3$ content, as oxides in weight %, is 0.20% or less.

6. High density magnesia clinker according to claim 1 in which the $Fe_2O_3$ content, as oxides in weight %, is 0.10% or less.

7. High density magnesia clinker according to claim 1 in which the $Al_2O_3$ content, as oxides in weight %, is 0.10% or less.

8. High density magnesia clinker according to claim 1 in which as oxides in weight %,
   MgO: 98.0% or more
   CaO: 0.8–1.6%.

9. High density magnesia clinker according to claim 1 in which the bulk density is 3.50 g/cm³ or more.

10. High density magnesia clinker according to claim 1 in which average particle diameter of periclase crystals of magnesia is 80$\mu$ or more.

11. High density and large crystal particle magnesia clinker according to claim 1 in which average particle diameter of periclase crystals of magnesia is 100$\mu$ or more.

12. A process for the production of high density magnesia clinker having a chemical composition, as oxides in weight %, of
   MgO: 97.5% or more
   CaO: 0.8–2.0%
   $SiO_2$: 0.12–1.0%
   $Fe_2O_3$: 0.3% or less
   $Al_2O_3$: 0.15% or less
   $B_2O_3$: 0.03% or less
with a bulk density of at least 3.48 g/cm³ and in which the average particle diameter of periclase crystals of magnesia is 70$\mu$ or more which comprises forming magnesium oxide by calcination of naturally occurring magnesite having a composition, based on ignition in weight %,
   MgO: 97.5% or more
   CaO: 0.8–2.0%
   $SiO_2$: traces to 0.15%
   $Fe_2O_3$: 0.3% or less
   $Al_2O_3$: 0.15% or less
   $B_2O_3$: 0.1% or less,
grinding the same after, or with, addition of amorphous silica, silica gel or a silicon compound capable of forming $SiO_2$ by dead-burning in such a manner as to have the $SiO_2$ content of 0.12–1.0% after dead-burning and dead-burning.

13. A process according to claim 12 comprising adding amorphous silica, silica gel or a silicon compound capable of forming $SiO_2$ by calcination in such a manner as to have the $SiO_2$ content of 0.13–0.8% in calcined magnesia clinker to magnesium oxide obtained by calcination of natural magnesite.

14. A process according to claim 12 comprising adding amorphous silica, silica gel or a silicon compound capable of forming $SiO_2$ by dead-burning in such a manner as to have the $SiO_2$ content of 0.14–0.4% in calcined magnesia clinker to magnesium oxide obtained by calcination of natural magnesite.

15. A process according to either of claims 12 to 15 comprising calcining at a temperature falling in the range of 800°–1200° C.

16. A process according to either of claims 12 to 14 comprising calcining at a temperature falling in the range of 850°–1150° C.

17. A process according to either of claims 12 to 14 comprising calcining at a temperature falling in the range of 900° C.–1100° C.

18. A process according to claim 12 comprising grinding in a vibration ball mill.

19. A process according to claim 12 comprising grinding in such a manner as to break the crystal skeleton of natural magnesite possessed by magnesium oxide formed by calcination.

20. The high density magnesia clinker according to claim 1 in which the magnesia clinker is derived from naturally occuring magnesite, and in which the $SiO_2$ content, as oxides in weight %, is 0.13–0.8%, the $Fe_2O_3$ content, as oxides in weight%, is 0.20% or less, the $Al_2O_3$ content, as oxides in weight%, is 0.10% or less, and in which the average particle diameter of periclase crystals of magnesia is 80μ or more.

21. The high density magnesia clinker according to claim 20 having large crystal particles and in which the $SiO_2$ content, as oxides in weight%, is 0.14–0.4% and in which the bulk density is 3.50 g/cm³ or more.

22. The high density, large crystal particle magnesia clinker according to claim 21 in which the content, as oxides in weight%, of MgO is 98.0% or more and of CaO is 0.8–1.6%.

* * * * *

UNITED STATES PATENT AND TRADEMARK OFFICE
CERTIFICATE OF CORRECTION

PATENT NO. : 4,585,743

DATED : April 29, 1986

INVENTOR(S) : Kosei Yamamoto et al.

It is certified that error appears in the above-identified patent and that said Letters Patent is hereby corrected as shown below:

Claim 15, line 1, "15," should read --14--.

Signed and Sealed this

Fifth Day of August 1986

[SEAL]

Attest:

DONALD J. QUIGG

Attesting Officer

Commissioner of Patents and Trademarks